United States Patent [19]
Wurl

[11] Patent Number: 5,092,649
[45] Date of Patent: Mar. 3, 1992

[54] BODY FOR A MOTOR VEHICLE, PARTICULARLY A PASSENGER CAR

[75] Inventor: Willi Wurl, Niefern-Oeschelbronn, Fed. Rep. of Germany

[73] Assignee: Dr. Ing. h.c.F. Porsche AG, Fed. Rep. of Germany

[21] Appl. No.: 703,860

[22] Filed: May 21, 1991

[30] Foreign Application Priority Data

Jun. 9, 1990 [DE] Fed. Rep. of Germany ....... 4018592

[51] Int. Cl.⁵ ............................................. B62D 23/00
[52] U.S. Cl. .................................. 296/185; 296/196; 296/203; 29/401.1
[58] Field of Search ............... 296/185, 193, 196, 197, 296/203, 205, 29; 29/401.1

[56] References Cited

U.S. PATENT DOCUMENTS

| | | | |
|---|---|---|---|
| 4,428,599 | 1/1984 | Jahnle | 296/203 |
| 4,747,636 | 5/1988 | Harasaki et al. | 296/203 |
| 4,957,326 | 9/1990 | Chiba et al. | 296/210 |
| 5,018,780 | 5/1991 | Yoshii et al. | 296/186 |

FOREIGN PATENT DOCUMENTS 3346986 7/1985 Fed. Rep. of Germany .
287058  3/1953 Switzerland .

*Primary Examiner*—Robert R. Song
*Attorney, Agent, or Firm*—Evenson, Wands, Edwards, Lenahan & McKeown

[57] ABSTRACT

A body for a motor vehicle, particularly a passenger car, has a bottom part and a top part, the bottom part and the top part being connected with one another approximately at the level of a belt line. So that an existing bottom part can be provided with different top parts in a simple manner and a good connection is achieved between the bottom part and the top part, separate junction elements are arranged in common connecting areas on the bottom part as well as on the top part, and interact with one another in a form-locking manner when the vehicle body is assembled. In addiition, a releasable connection is provided in each connecting area between the corresponding junction elements which are disposed above one another.

12 Claims, 8 Drawing Sheets

BODY FOR A MOTOR VEHICLE, PARTICULARLY A PASSENGER CAR

BACKGROUND AND SUMMARY OF THE INVENTION

The present invention relates to a body for a motor vehicle, particularly passenger car, which has a bottom part and a top part, the bottom part and the top part being connected with one another approximately at the level of a belt line.

In a known arrangement of the above-mentioned type (Swiss Patent Document CH-PS 287 058), the top part and the bottom part are connected with one another at their two ends, the frame structure of the top part and the bottom part being formed essentially by sheet steel stampings.

From the German Patent Document DE-OS 33 46 986, a body for a passenger car is known, the bearing structure of which is formed by extruded profiles made of light metal in connection with junction elements made of light metal. A separation of the top part and the bottom part is not provided in this arrangement.

An object of the present invention is to provide a body for a passenger car in which the bottom part can be provided, in a simple manner, with different top parts (different roof configurations), and that a good connection is achieved between the bottom part and the top part.

This and other objects are achieved by the present invention which provides a body for a motor vehicle having a bottom part and a top part, the bottom part and the top part being connected with one another at common connecting areas approximately at the level of a belt line. The bottom part and the top part each have bearing frame structures that are formed substantially by extruded profiles made of light metal. There are junction elements made of a light metal casting that connect adjacent extruded profiles with one another, with respective separate junction elements being arranged in the common connecting areas on the top part and on the bottom part. The junction elements interact with one another in a form-locking manner when the vehicle body is assembled. At least one releasable connection is provided between corresponding junction elements disposed above one another in each connecting area.

Some of the principal advantages achieved by the present invention are that, by means of the arrangement of two separate junction elements (one on the bottom part, one on the top part) respectively in each common connecting area, on the one hand, an operationally appropriate connection between the top part and the bottom part is provided and, on the other hand, an existing bottom part, in a simple manner, can be combined with different top parts. Without expensive body work, a bottom part can in this manner be equipped or subsequently selectively retrofitted with a hardtop, a targa top or a convertible top.

As a result of the separation of the bottom part and the top part, the interior fittings, the seats and the like, may be mounted from above, which facilitates the mounting process. By means of centering devices, a perfect fit is achieved of the top part relative to the bottom part.

Other objects, advantages and novel features of the present invention will become apparent from the following detailed description of the invention when considered in conjunction with the accompanying drawings.

DETAILED DESCRIPTION OF THE DRAWINGS

Figure 1:
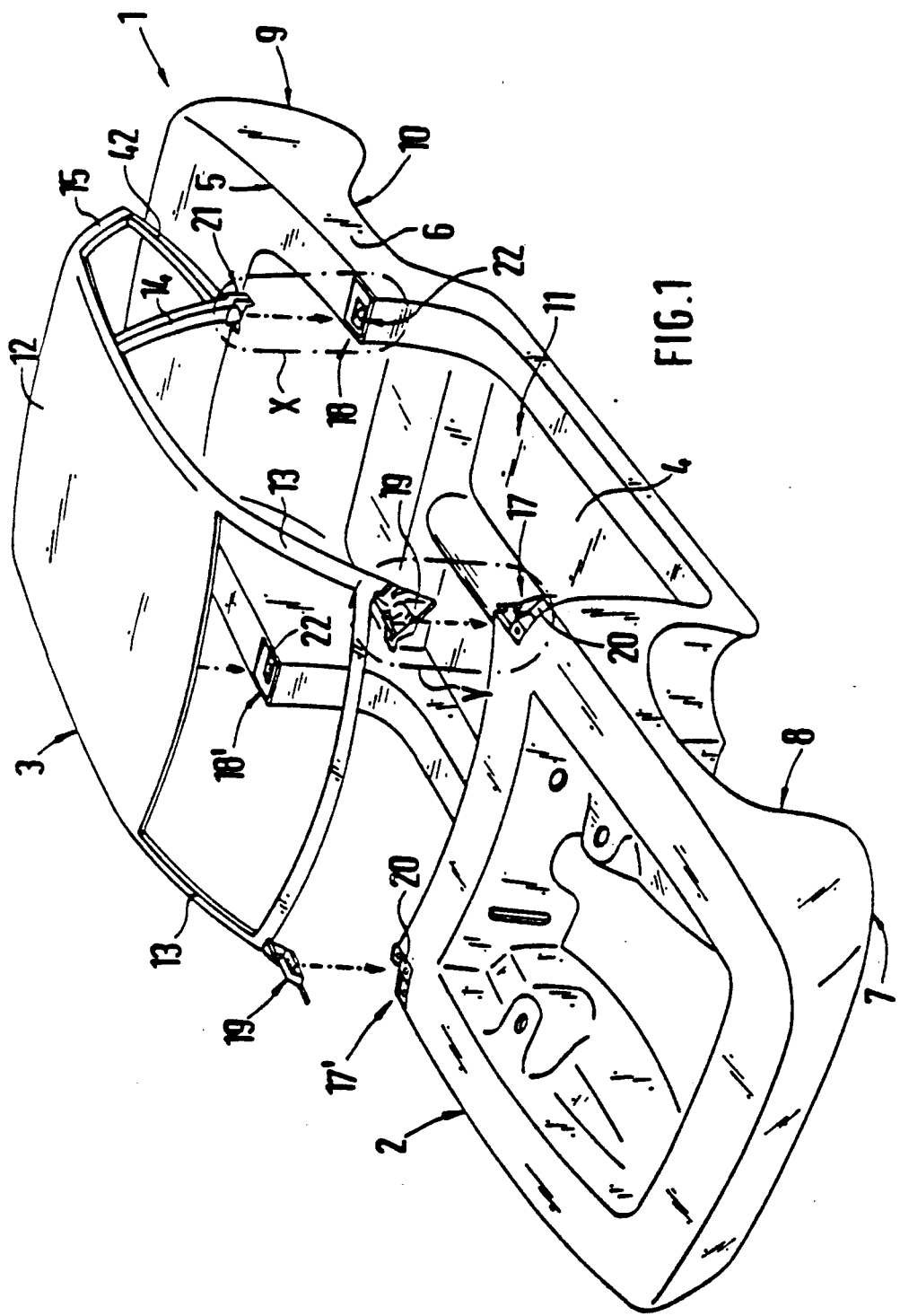
FIG. 1 is a perspective representation of a passenger car body composed of a separate bottom part and top part according to an embodiment of the present invention, in the unfinished condition.

FIG. 1 illustrates a body 1 for a passenger car which has a separately manufactured bottom part and an also separately manufactured top part 3. The bottom part 2 of the passenger car body comprises a body floor 4, side walls 6 projecting to a belt line 5, a forward structure 7 with wheel houses 8 for the front wheels, a rear part 9 with wheel houses 10 for the rear wheels, and lateral door openings 11.

Figure 2:
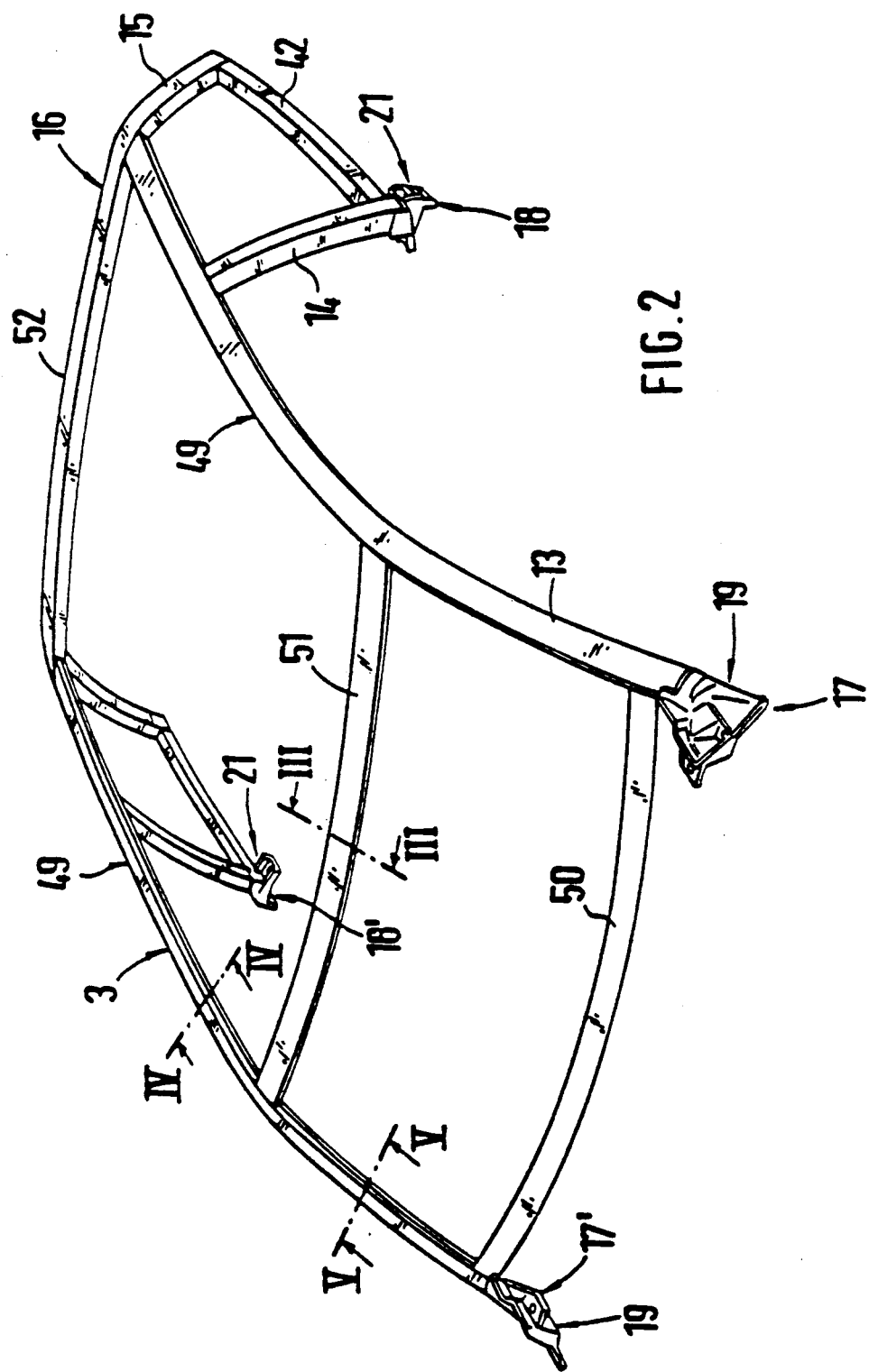
FIG. 2 is a perspective representation of the top part constructed as a hardtop.

The top part 3 comprises a roof 12 and body pillars 13, 14, 15. The bearing frame structure 16 of the bottom part 2 and the top part 3 is essentially made of extruded profiles which are connected with one another by junction elements made of a casting. The extruded profiles as well as the junction elements are preferably manufactured of light metal. FIG. 2 illustrates the frame structure 16 of the top part 3, whereas the frame structure 16 of the bottom part 2 is not shown in detail.

Figure 9:
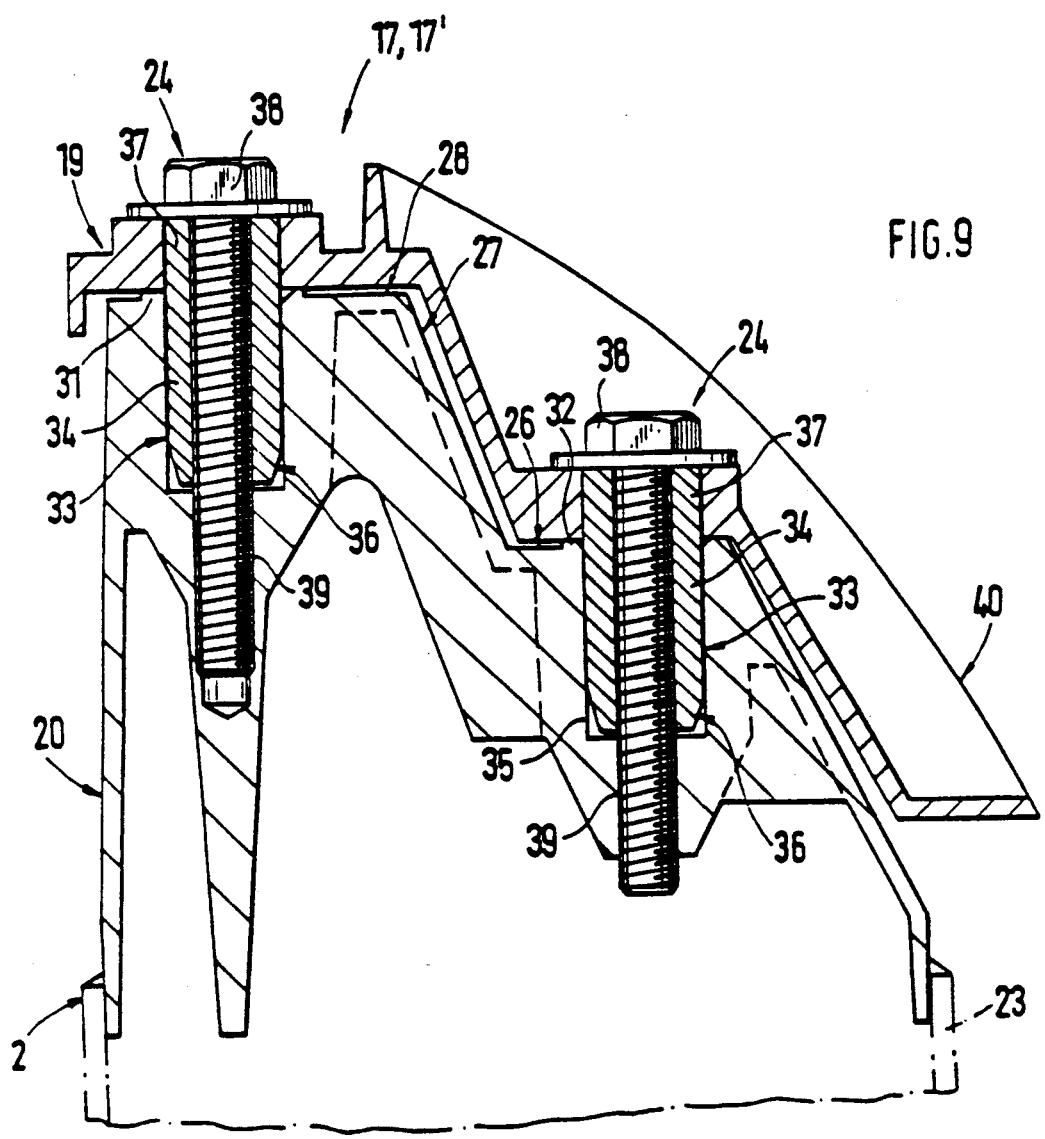
FIG. 9 is an enlarged sectional view according to Line IX—IX of FIG. 8 of the two forward junction elements.

According to FIGS. 1 and 2, in the common connecting areas 17, 17', 18, 18', respective separate junction elements 19, 20; 21, 22 are arranged on the bottom part 2 as well as on the top part 3 and are joined during the assembly of the body so that a form-locking interaction takes place of the respective mutually corresponding junction elements 19 and 20, 21 and 22. In addition, at least one releasable connection 24, such as a screwed connection, is provided between the corresponding junction elements 19 and 20, 21 and 22 (FIG. 9).

Figure 8:
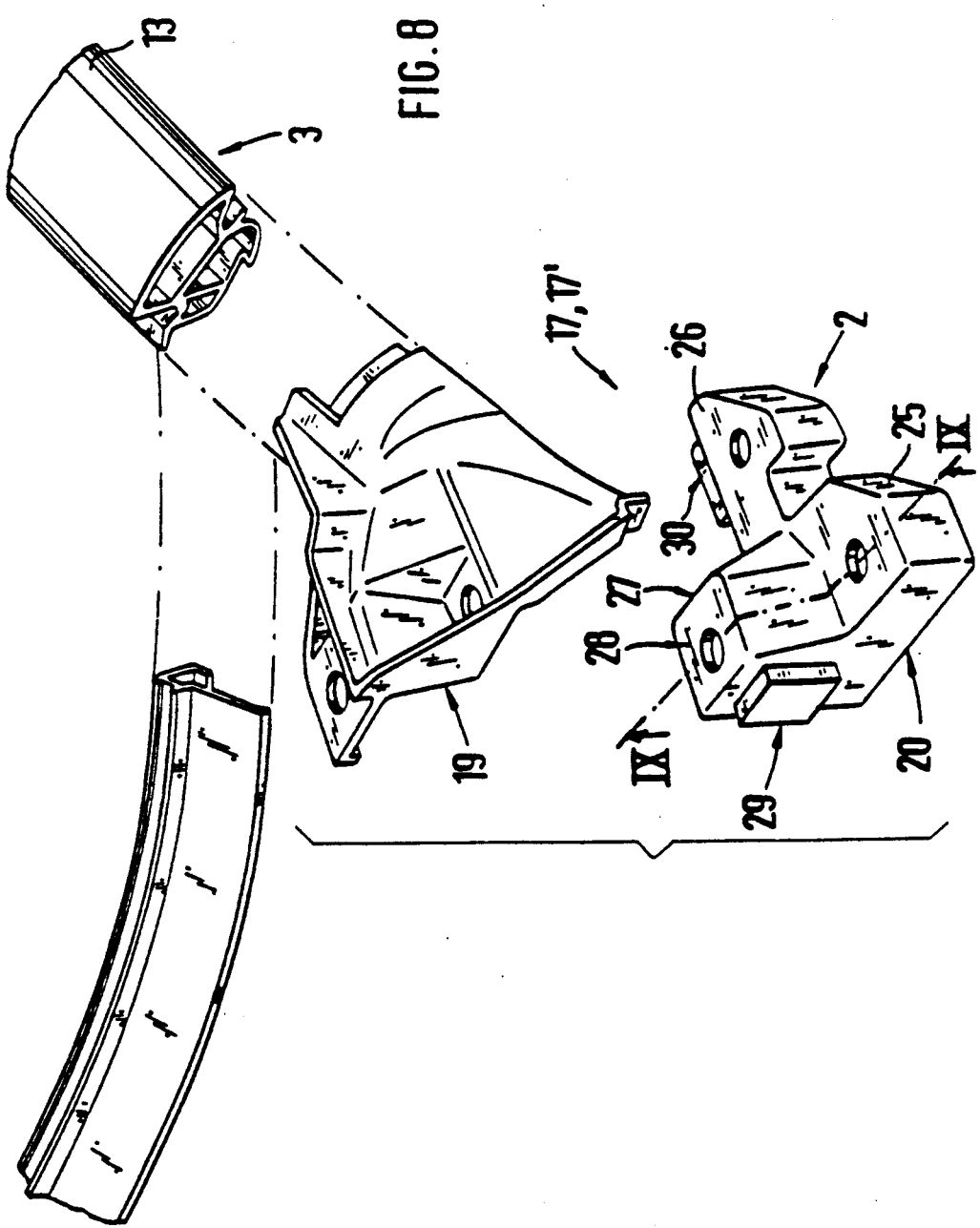
FIG. 8 is an enlarged and exploded representation of a detail Y of FIG. 1.

In the illustrated embodiment of the present invention, two connecting areas 17, 18 and 17', 18' disposed behind one another are provided on each longitudinal side of the body 1 (FIG. 1). In a forward connecting area 17, 17', a junction element 20 is provided at the bottom part 2 and is fitted from above into an open upright hinge pillar 23 (FIG. 8 and 9).

The junction element 20 has a basic body 25 adapted to the inside contour of the hinge pillar 23 and has an approximately horizontally extending upper boundary surface 26. An elevation 27 which approximately has the shape of a rectangular solid is provided in a corner area of the boundary surface 26, an upper boundary surface 28 of the elevation 27 being aligned horizontally. In addition, the junction element 20 has two molded-on parts 29, 30 to which, on the one side, a transversely extending (not shown) control panel cross member and, on the other side, a side member (also not shown) are connected from the top front. The two molded-on parts 29, 30 are adapted to the profile shape of the control panel cross member and the side member from the top front and, in sections, project into the end areas of these members.

As a counterpart of the junction element 20, a junction element 19 is provided on the top part 3 which is fixedly connected with the forward end of the pillar 13 disposed on the bottom. The junction element 19 is inserted in sections into the pillar 13. Junction element 19 is also adapted to the step-shaped course of the lower junction element 20.

When the top part 3 and the bottom part 2 are assembled, the top junction element 19 is situated locally on projecting ring-shaped bearing sections 31, 32 (FIG. 9) of the lower junction element 20, the bearing sections 31, 32 being constructed on the horizontal boundary surfaces 26, 28.

For facilitating the mounting during the assembly, a centering device 33 is provided in the forward connecting area 17, 17' between the two junction elements 19, 20. The centering device 33 comprises at least one centering pin 34 which form-lockingly interacts with a corresponding receiving device 35. According to FIG. 9, two centering pins 34, which are arranged at a distance from one another, are arranged on the upper junction element !9 and engage in receiving devices 35 of the lower junction element 20. The centering pins 34 are fastened to the top junction element 19, in which case a cylindrical section is guided through a bore of the junction element 19 and protrudes in the downward direction. A lower end area of the centering pin 34 has a chamfer 36 on the exterior side for an easier introduction into the receiving device 35.

According to FIG. 9, the centering pins 34 are constructed as hollow cylinders 37 in such a manner that fastening screws 38 for connecting the two junction elements 19, 20 may be guided through them. In the illustrated embodiment, three fastening screws 38 which extend in parallel to one another are provided between the two junction elements 19, 20, the fastening screws 38 being aligned approximately vertically.

The fastening screws 38 are screwed from above into threaded bores 39 of the lower junction element 20. The upper junction element 19 locally has a curved supporting surface 40, a forward fender, which is not shown, resting locally on the supporting surface, in which case, when the vehicle body is assembled, the fender covers the upper junction element 19 almost completely.

Figure 6:
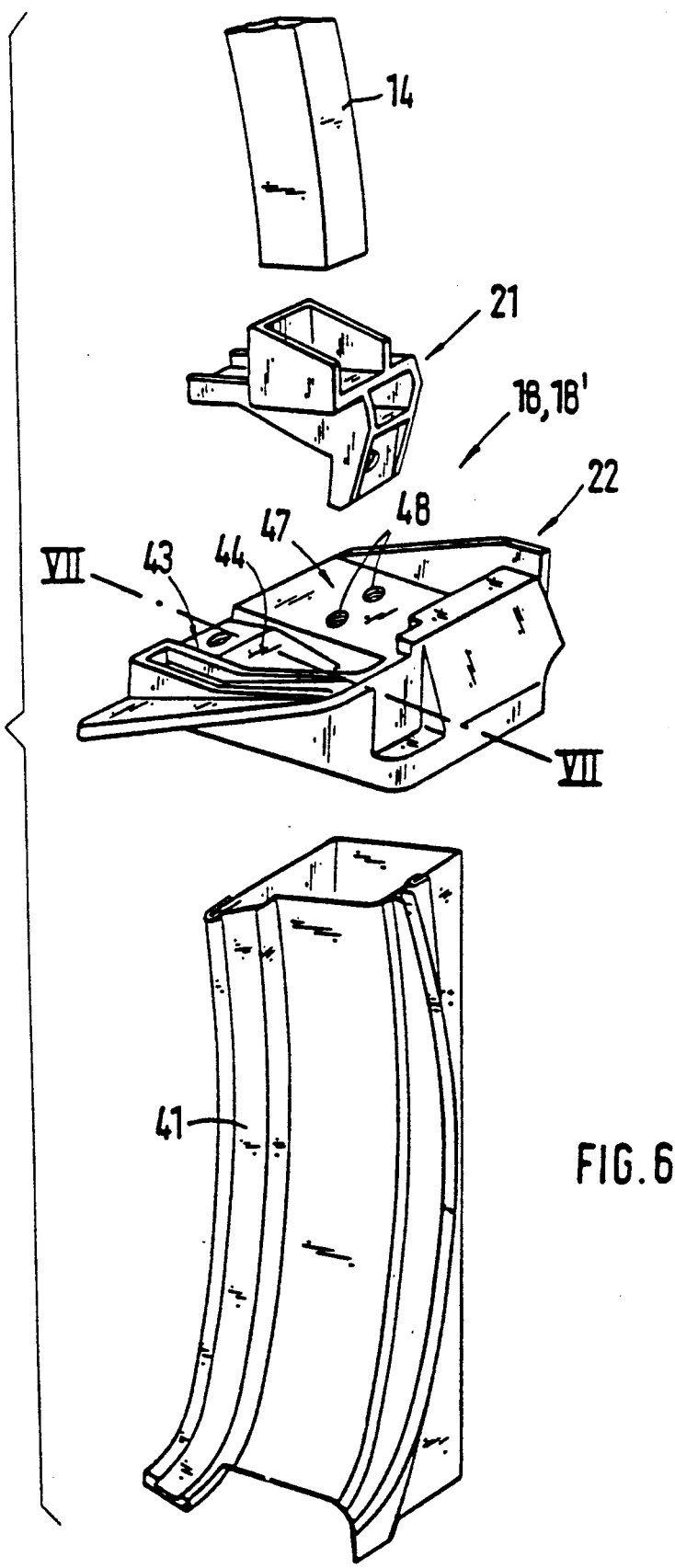
FIG. 6 is an enlarged and exploded representation of a detail X of FIG. 1.
Figure 7:
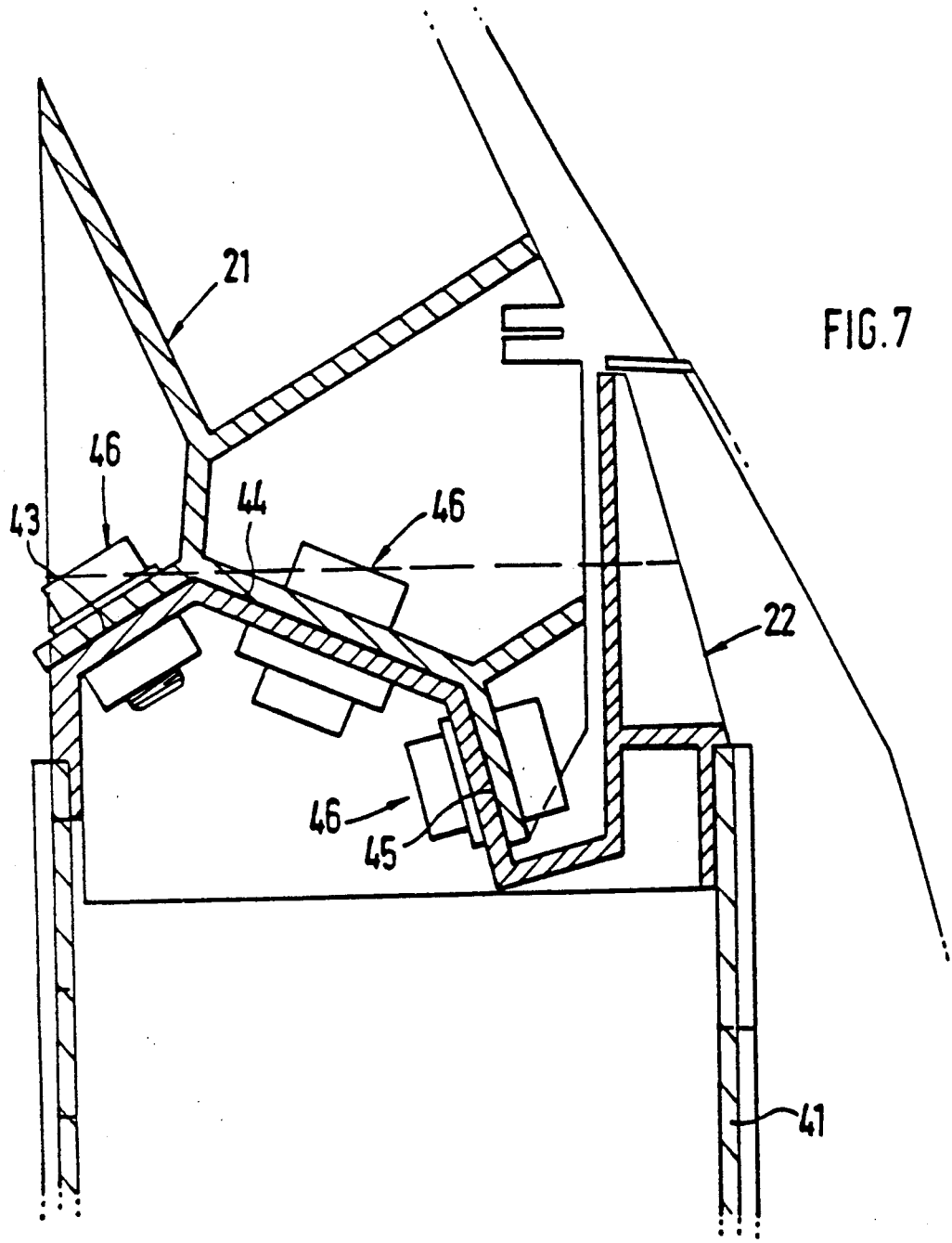
FIG. 7 is an enlarged sectional view according to Line VII—VII of FIG. 6 of the two rearward junction elements.

In a rear connecting area 18, 18', two separate junction elements 21, 22 are also provided on each longitudinal side of the vehicle (FIG. 6). In this case, a lower junction element 22 is inserted from above into the upright center pillar or lock pillar 41 and is held in position. A side member, which is not shown, is connected to this lower junction element 22 at the rear top. An upper junction element 21 is pushed into the pillar 14 disposed on top and is fixedly connected with it. A lower frame part 42 of a rear side window, which is not shown, is connected to this junction element 21. In a common bearing area, three bearing surfaces 43, 44, 45 respectively, which are arranged at an angle with respect to one another and are adapted to one another, are arranged on the upper and on the lower junction element 21, 22 (FIGS. 6 and 7).

A fastening screw 46 is provided on each bearing surface 43, 44, 45, the three fastening screws 46 being aligned differently. An interior fastening screw 46 is mounted from above, whereas the two other fastening screws 46 are screwed in from the bottom.

In the rear connecting area 18, 18', the centering of the top part 3 and of the bottom part 2 is formed by the different slopes of the three bearing surfaces 43, 44, 45 of the two junction elements 21, 22. In addition, the lower junction element 22 has a plane horizontal surface 47 on which two threaded bores 48 are provided into which the fastening screws may be screwed for a bearing block of a convertible top which is not shown in detail.

All junction elements 19, 20, 21, 22 are adapted to the shape of the member structures which surround them, the junction elements 19, 20, 21, 22, in addition, being connected with the adjacent member structure by means of gluing or welding.

FIG. 2 illustrates a hardtop which is composed of a frame structure 16 and the actual roof. The frame structure 16 comprises two laterally exterior roof frame rails 49 which are assembled into a cage-type structure from a cowl cross member 50, a front roof frame cross member 51 and a rear roof frame cross member 52. A forward section of the roof frame rails 49, in sections, forms the pillar 13 (windshield pillar or A-pillar).

In addition, the frame structure 16 comprises a B-pillar 14 and a longitudinally extending frame part 42 for the rear side window, the frame part 42 being fixedly connected with the B-pillar 14 and the rear roof frame cross member 52. A windshield 53 is inserted into the frame formed by the two roof frame rails 49 (FIG. 3), the lower cowl cross member 50 and the front roof frame cross member 51, and is connected with the frame by an adhesive body. The rear area of the frame structure 16 is covered either by a sheet metal part, a plastic part or a large-surface window.

Figure 3:
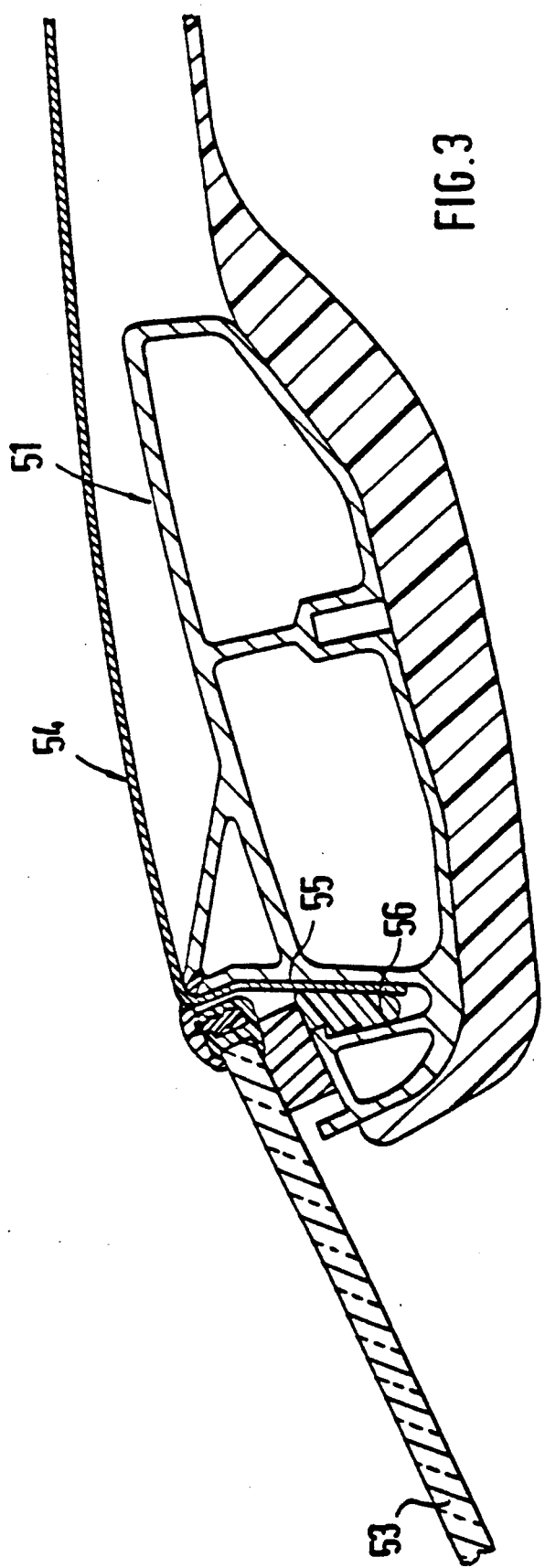
FIG. 3 is an enlarged sectional view according to Line III—III of FIG. 2.

According to FIG. 3, a sheet metal part 54 is provided which is made of aluminum and is held in position by a clamped connection on the front roof frame cross member 51, the two lateral roof frame rails 49 and the rear roof frame cross member 52. A web 55 of the roof which is bent away in the downward direction is fastened by a clamping body 56, the clamping body 56 being inserted into a receiving groove of the extruded profile. In addition, a glued connection is provided between the clamping body 56 and the receiving groove of the extruded profile.

Figure 4:
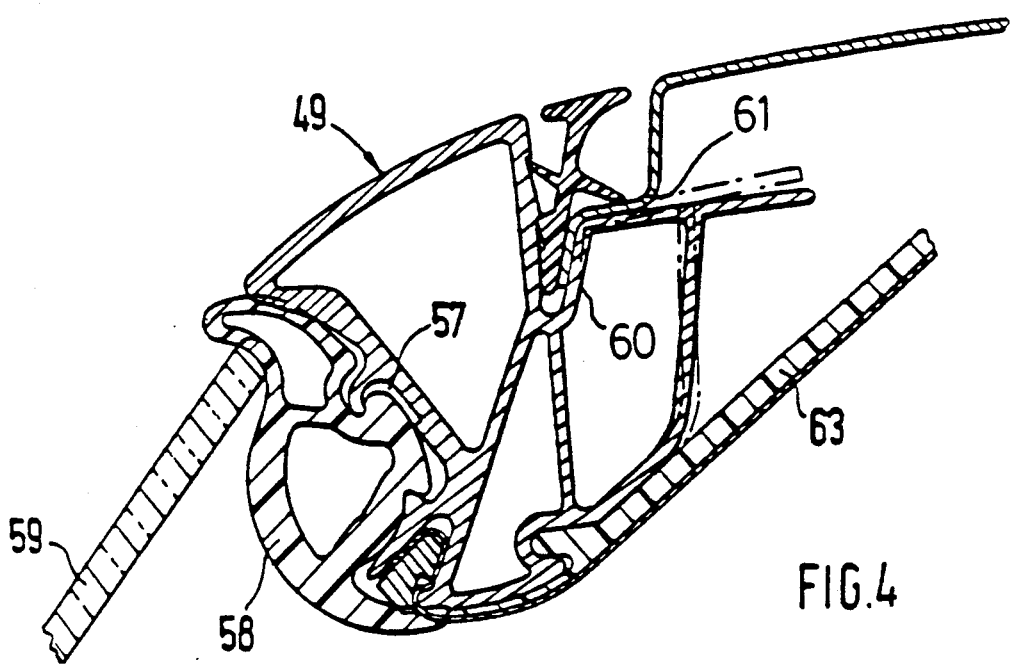
FIG. 4 is an enlarged sectional view according to Line IV—IV of FIG. 2.
Figure 5:
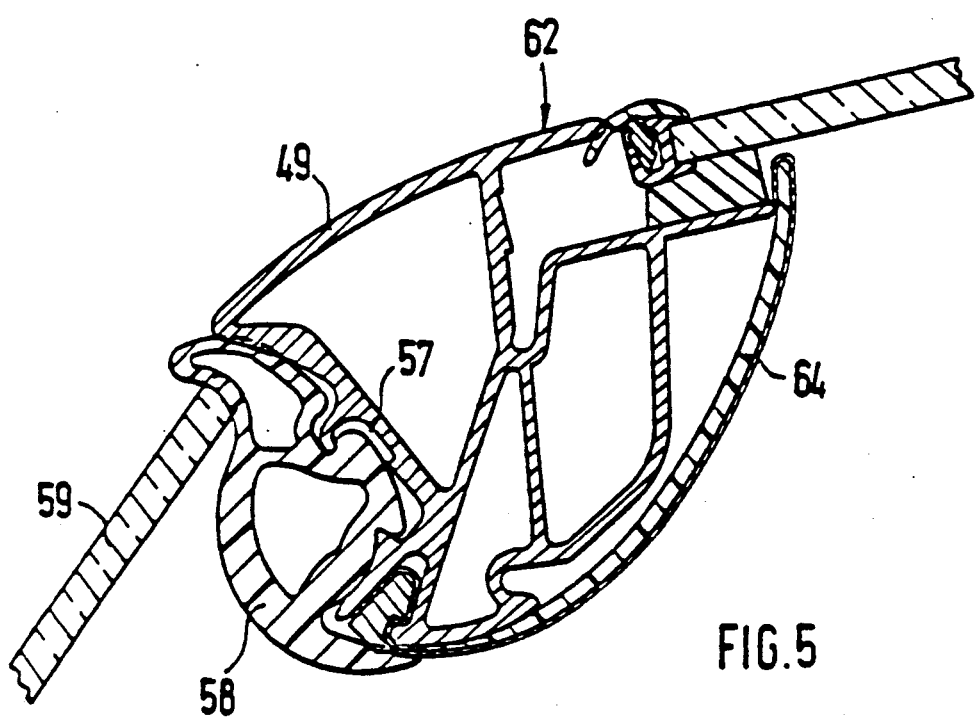
FIG. 5 is an enlarged sectional view according to Line V—V of FIG. 2.

FIGS. 4 and 5 each show a sectional view of the lateral roof frame rail 49, the extruded profile, for reasons of stiffness, being constructed as a multi-chamber profile. The extruded profile 49 locally has an undercut receiving groove 57 for a sealing body 58 which interacts with a lateral door window 59. In addition, a receiving web 60 shaped to receive the adhesive body of the windshield 53 or a bent-away connecting part 61 of the roof 12, which connects the roof 12 to the extruded profile, is provided on the extruded profile. By trimming an exterior flange 62 of the extruded profile, differing widths of the extruded profile can be achieved along its longitudinal dimension. In addition, a roof ceiling 63 and a pillar covering 64 are fastened to the roof frame rail 49. For this purpose, one or several receiving grooves are provided on the extruded profile.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A body for a motor vehicle comprising:
    a bottom part and a top part, the bottom part and the top part being connected with one another at common connecting areas approximately at the level of a belt line;
    wherein the bottom part and the top part each have bearing frame structures that are formed substantially by extruded profiles made of light metal;
    junction elements made of a light metal casting that connect adjacent extruded profiles with one another, with respective separate junction elements being arranged in the common connecting areas on the top part and on the bottom part, said junction elements interacting with one another in a form-locking manner when the vehicle body is assembled; and
    at least one releasable connection is provided between corresponding junction elements disposed above one another in each connecting area.

2. A motor vehicle body according to claim 1, wherein at least two common connecting areas are provided between the top part and the bottom part on each longitudinal side of the body.

3. A motor vehicle body according to claim 1, wherein one of said junction elements is provided in a forward connecting area on the bottom part and is fixedly connected with an adjacent hinge pillar, said junction element including means for connecting a side member to this junction element on the top front and to a control panel cross member.

4. A motor vehicle body according to claim 1, wherein one of said junction elements is mounted on the top part in the forward connecting area and is fixedly connected with an adjacent pillar.

5. A motor vehicle body according to claim 1, further comprising a centering device arranged in the forward connecting area between the top part and the bottom part, said centering device having at least one approximately upright-aligned centering pin which engages in a corresponding receiving device.

6. A motor vehicle body according to claim 5, wherein the centering pin is arranged on the junction element mounted on the top part, and the receiving device is provided on the junction element mounted on the bottom part.

7. A motor vehicle body according to claim 6, wherein the centering pin is a hollow cylinder, and further comprising fastening screws for connecting the top part and the bottom part guided through the hollow cylinder.

8. A motor vehicle body according to claim 1, wherein one of said junction elements that, in a rear connecting area, a junction element is provided which is fastened to the bottom part and which is fixedly connected with an adjacent center pillar or lock pillar, a side member being connected to this junction element on the rear top.

9. A motor vehicle body according to claim 1, further comprising an upright pillar and a frame for a rear side window and wherein one of said junction elements is mounted in a rear connecting area on the top part and is connected with the upright pillar and the frame for a rear side window.

10. A motor vehicle body according to claim 1, wherein the rear junction elements each have three bearing surfaces, that are arranged at an angle with respect to one another, with a fastening screw being provided in the area of each bearing surface.

11. A motor vehicle body according to claim 5, wherein the centering pin is a hollow cylinder, and further comprising fastening screws for connecting the top part and the bottom part guided through the hollow cylinder.

12. A method of assembling a body for a motor vehicle comprising:
    connecting with one another a bottom part and a top part of the body of the motor vehicle at common connecting areas approximately at the level of a belt line, where the bottom part and the top part each have bearing frame structures that are formed substantially by extruded profiles made of light metal;
    wherein the step of connecting the bottom part and the top part with one another includes causing respective separate junction elements, made of a light metal casting that are arranged in the common connecting areas on the top part and on the bottom part, to interact with one another in a form-locking manner and thereby connect adjacent extruded profiles with one another when the vehicle body is assembled to; and
    releasably connecting at least one set of corresponding junction elements disposed above one another in each connecting area.

* * * * *